(12) United States Patent
Ohishi et al.

(10) Patent No.: US 9,792,867 B2
(45) Date of Patent: Oct. 17, 2017

(54) DISPLAY APPARATUS

(71) Applicant: Sakai Display Products Corporation, Sakai-shi, Osaka (JP)

(72) Inventors: Takuya Ohishi, Sakai (JP); Kohichi Sawada, Sakai (JP); Hayato Uehara, Sakai (JP); Akira Yamamoto, Sakai (JP); Tomohiro Inoue, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/410,934

(22) PCT Filed: Jan. 29, 2014

(86) PCT No.: PCT/JP2014/051892
§ 371 (c)(1),
(2) Date: Dec. 23, 2014

(87) PCT Pub. No.: WO2014/129272
PCT Pub. Date: Aug. 28, 2014

(65) Prior Publication Data
US 2015/0379948 A1   Dec. 31, 2015

(30) Foreign Application Priority Data
Feb. 19, 2013 (JP) ................ 2013-030131

(51) Int. Cl.
G09G 3/36 (2006.01)
G02F 1/1345 (2006.01)
G02F 1/1362 (2006.01)

(52) U.S. Cl.
CPC ......... G09G 3/3648 (2013.01); G02F 1/1345 (2013.01); G02F 1/136286 (2013.01);
(Continued)

(58) Field of Classification Search
CPC ............ G02F 1/136286; G09G 3/3688; G09G 2300/0426; G09G 2330/021
See application file for complete search history.

(56) References Cited

U.S. PATENT DOCUMENTS

2003/0043126 A1*  3/2003  Fujino ................. G09G 3/3688
                                                                    345/204
2006/0087218 A1*  4/2006  Mikami ................. H01J 9/241
                                                                    313/495
(Continued)

FOREIGN PATENT DOCUMENTS

| JP | 11-212117 A | 8/1999 |
| JP | 2003-172945 A | 6/2003 |
| JP | 2006-302698 A | 11/2006 |

*Primary Examiner* — Vijay Shankar
*Assistant Examiner* — Nan-Ying Yang
(74) *Attorney, Agent, or Firm* — Rudy J. Ng; Bret E. Field; Bozicevic, Field & Francis LLP

(57) ABSTRACT

Provided is a display device capable of suppressing electrostatic breakdown due to dummy wiring even when the dummy wiring is arranged adjacent to signal wiring supplying a display region with a driving signal.
Two first supply circuit boards supply the display pixels in each row with a scanning signal, and four second supply circuit boards supply the display pixels in each column with a data signal. Dummy wiring is arranged at the position on the board adjacent to the outermost scanning signal wiring of a plurality of scanning signal wirings connected to each first supply circuit board. The offset distance from the dummy wiring to the peripheral conductor excluding the scanning signal wiring is longer than the offset distance between the dummy wiring and the scanning signal wiring.

9 Claims, 8 Drawing Sheets

(52) U.S. Cl.
CPC ............... *G02F 1/136204* (2013.01); *G09G 2300/0404* (2013.01); *G09G 2300/0413* (2013.01); *G09G 2300/0426* (2013.01); *G09G 2300/0469* (2013.01); *G09G 2300/0478* (2013.01); *G09G 2320/0219* (2013.01)

(56) References Cited

U.S. PATENT DOCUMENTS

| | | | |
|---|---|---|---|
| 2008/0079685 A1* | 4/2008 | Umezaki .............. | G09G 3/3677 345/100 |
| 2009/0231255 A1* | 9/2009 | Tanimoto .......... | G02F 1/136286 345/87 |
| 2014/0084941 A1* | 3/2014 | Yun ........................ | G09G 3/006 324/543 |

* cited by examiner

DISPLAY APPARATUS

This application is the national phase under 35 U.S.C. §371 of PCT International Application No. PCT/JP2014/051892 which has an International filing date of Jan. 29, 2014 and designated the United States of America.

BACKGROUND OF THE INVENTION

1. Field of the Invention

The present invention relates to a display apparatus that comprises, on a substrate thereof, a display region including a plurality of display pixels arranged in a matrix, a plurality of conductive patterns extending from the display region, and a supply part for supplying a driving signal through the conductive patterns.

2. Description of Related Art

A display apparatus can be an LCD (Liquid Crystal Display), an OLED (Organic Electroluminescent Display) or the like, which is widely used for a monitor display of a computer, a television receiver or the like. The display apparatus includes, on a substrate thereof, a display region for displaying an image, supply parts for supplying a scanning signal and a data signal to the display region, and a signal wiring for connecting them.

More specifically, a display apparatus of an active matrix type using a switching element, a TFT (thin film transistor) for example, has a display region containing a plurality of display pixels arranged in a matrix within a region of a rectangular-shaped array substrate excluding a peripheral part thereof. Then, a plurality of scanning signal wirings and a plurality of data signal wirings extending outside the display region corresponding to rows and columns of the display pixels are respectively connected to a scanning signal supply part and a data signal supply part disposed an end part in a longitudinal direction of the array substrate and an end part in a direction orthogonal to the longitudinal direction, respectively.

In recent years, reduction in the ratio of a width of a peripheral part of an array substrate to a display region, which is so-called narrowing frame width, has been advanced. In accordance therewith, conductive patterns as a scanning signal wiring and a data signal wiring have been fined. A conductive pattern is formed on an array substrate using techniques of lithography and etching. It is known that etching progress changes in accordance with the degree of density of the conductive pattern.

Therefore, in a region where conductive patters are densely formed, for a conductive pattern located in a boundary portion with a less-dense region, etching is excessively progressed and the width of the conductive pattern is narrowed whereby a resistance value as a wiring is increased. Due to this problem, a signal source impedance of a driving signal to the display region is increased. The finer the conductive pattern is, and the longer the conductive pattern is, it is easily affected by this problem.

As a specific influence of the problem, when a conductive pattern as a scanning signal wiring is made thinner, the timing when a switching element contained in a display pixel is turned on is delayed, and a dark line (or bright line) in the horizontal direction is visually recognized in an image to be displayed in a display region. Also, when a conductive pattern as a data signal wiring is made thinner, the supply of a data signal to a pixel electrode contained in a display pixel is insufficient, and a dark line (or bright line) in the vertical direction is visually recognized in an image to be displayed in a display region.

To address this issue, a liquid crystal display apparatus is proposed in which, by placing a dummy wiring or a plurality of dummy wirings having the same or substantially the same pitch as that of a gate wiring outside gate wirings (scanning signal wirings) respectively located at the first row and the last row of the display region, the gate wiring is note made thinner even if the dummy wiring is made thinner in etching of the gate wiring.

SUMMARY OF THE INVENTION

However, even if a dummy wiring is simply placed along a gate wiring using the above proposed technique, there is a possibility that a conductive pattern around the dummy wiring and the connected party of the conductive pattern are electrostatically broken due to static electricity charged in the dummy wiring, which may cause display failure.

The present invention is made in view of the above circumstances. An object of the present invention is to provide a display apparatus in which, even when a dummy wiring is placed adjacent to a signal wiring for supplying a driving signal to a display region, electrostatic breakdown due to the presence of the dummy wiring can be suppressed.

A display apparatus according to the present invention comprises, on a substrate, a display region including a plurality of display pixels arranged in a matrix; a plurality of first conductive patterns and a plurality of second conductive patterns respectively corresponding to rows and columns of the display pixels, and extending outside the display region; and a first supply part and a second supply part that respectively supply a driving signal through the first conductive patterns and the second conductive patterns to the display pixels, and is characterized by further comprising a third conductive pattern adjacent to the plurality of first conductive patterns connected to the first supply part (or the plurality of second conductive patterns connected to the second supply part) placed on the substrate, wherein the third conductive pattern has a separation distance from a peripheral conductor excluding the first conductive patterns (or the second conductive patterns) greater than a separation distance from the first conductive patterns (or the second conductive patterns).

The display apparatus according to the present invention is characterized by further comprising an insulating layer having one surface side on which the first conductive patterns (or the second conductive patterns) and the third conductive pattern are placed, and the other surface side on which a plurality of fourth conductive patterns having overlapping with the respective first conductive patterns (or the second conductive patterns) are placed, wherein the third conductive pattern has overlapping with another conductive pattern and each of the fourth conductive patterns placed on the other surface side of the insulating layer smaller than the overlapping between the first conductive patterns (or the second conductive patterns) and the fourth conductive patterns, or the third conductive pattern has no overlapping with said another conductive pattern and the fourth conductive patterns.

A display apparatus according to the present invention comprises, on a substrate, a display region including a plurality of display pixels arranged in a matrix; a plurality of first conductive patterns and a plurality of second conductive patterns respectively corresponding to rows and columns of the display pixels, extending outside the display region; and a first supply part and a second supply part that respectively supply a driving signal through the first conductive patterns and the second conductive patterns to the display pixels, and is characterized by further comprising an insulating layer placed on the substrate, which has one surface side on which the plurality of first conductive patterns connected to the first supply part (or the plurality of second conductive patterns connected to the second supply part) and a third conductive pattern adjacent to the first conductive patterns (or the second conductive patterns) are placed, and the other surface side on which a plurality of fourth conductive patterns having overlapping with the respective first conductive patterns (or the second conductive patterns) are placed, wherein the third conductive pattern has overlapping with another conductive pattern and each of the fourth conductive patterns placed on the other surface side of the insulating layer smaller than overlapping between the first conductive patterns (or the second conductive patterns) and the fourth conductive patterns, or the third conductive pattern has no overlapping with said another conductive pattern and the fourth conductive patterns.

The display apparatus according to the present invention is characterized by that the third conductive pattern has substantially a same conductive width as a width of each of the first conductive patterns (or the second conductive patterns), and a separation distance from the first conductive pattern (or the second conductive pattern) is substantially a same as a separation distance between the first conductive patterns (or the second conductive patterns).

The display apparatus according to the present invention is characterized by that the first conductive patterns (or the second conductive patterns) and the third conductive pattern are branched into a plurality of branch patterns toward the first supply part (or the second supply part), and end parts of the branch patterns of the third conductive pattern are connected with each other.

According to the present invention, it is possible to suppress that the electrostatic breakdown spreads from the third conductive pattern to a peripheral conductor and the connected party of the conductor.

Thus, even when a dummy wiring is placed adjacent to a signal wiring for supplying a driving signal to a display region, electrostatic breakdown due to the presence of the dummy wiring can be suppressed.

DESCRIPTION OF THE PREFERRED EMBODIMENTS

The present invention is described below with reference to the drawings illustrating the embodiments thereof.

Embodiment 1

Figure 1:
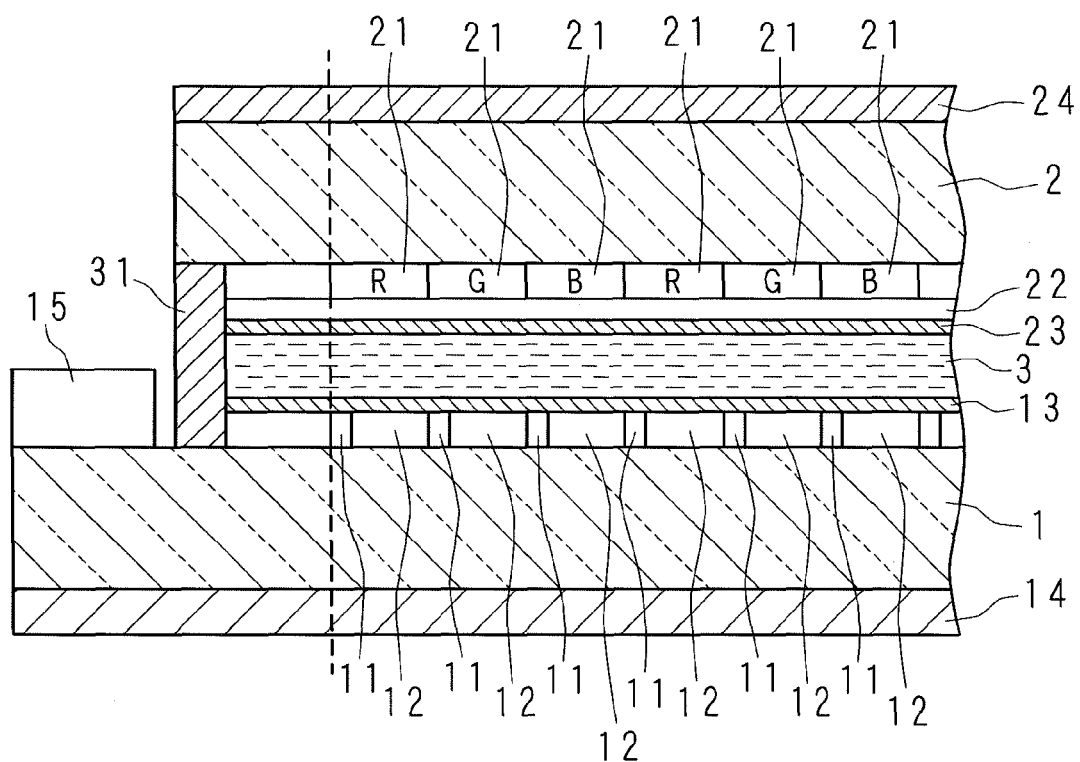
FIG. 1 is a cross-sectional view diagrammatically illustrating a configuration of a display apparatus according to Embodiment 1 of the present invention.
Figure 2:
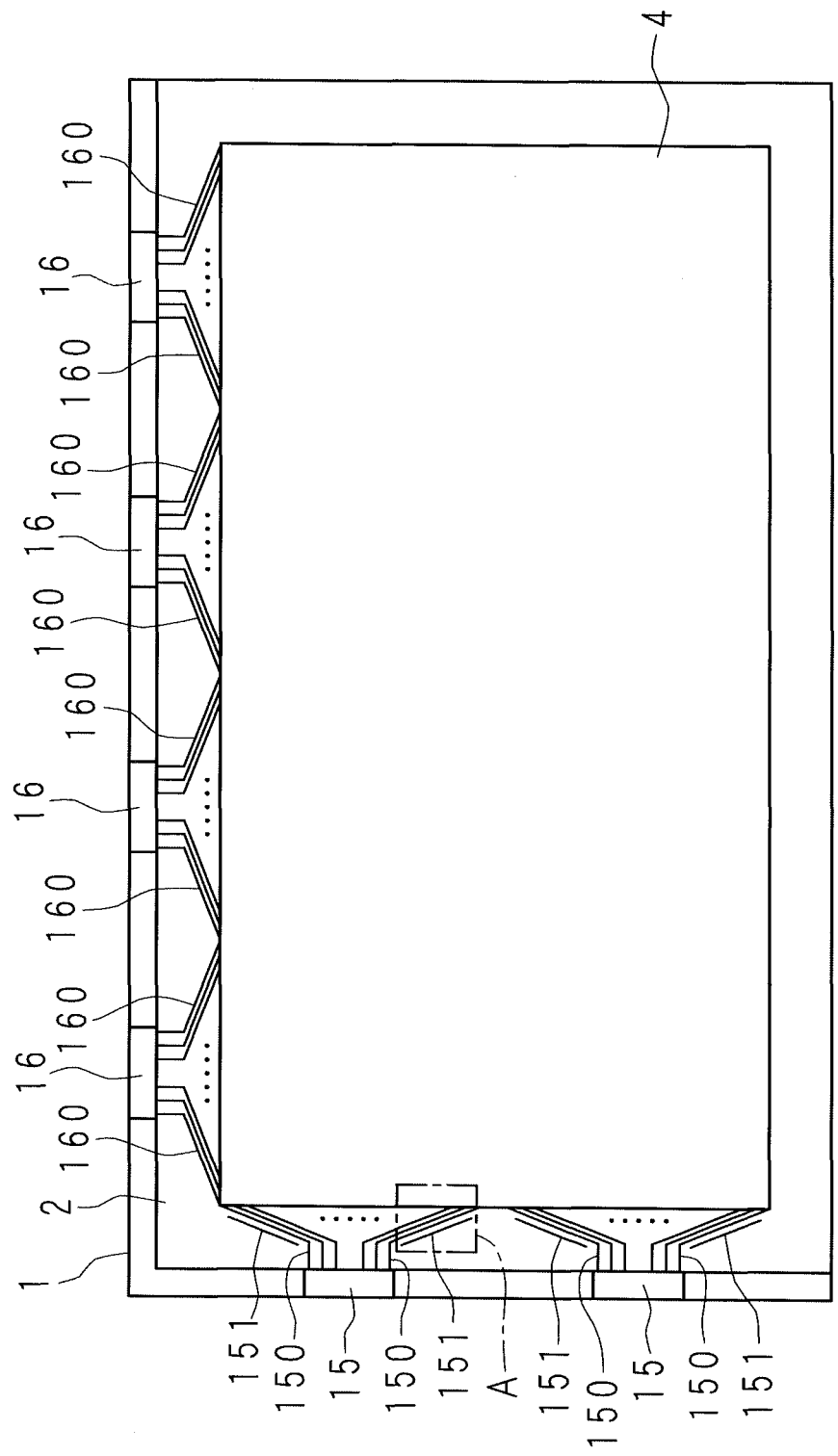
FIG. 2 is a plan view illustrating the display apparatus.
Figure 3:
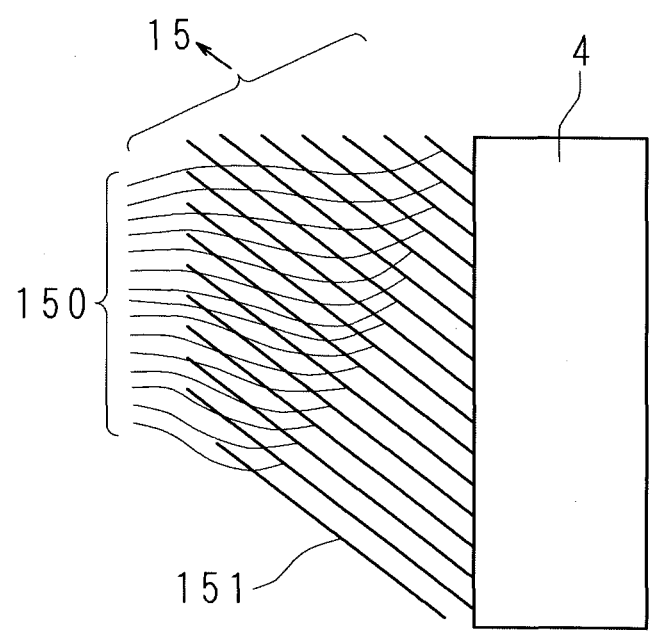
FIG. 3 is an enlarged plan view illustrating a main part indicated by the reference sign A in FIG. 2.

FIG. 1 is a cross-sectional view diagrammatically illustrating a configuration of a display apparatus according to Embodiment 1 of the present invention, FIG. 2 is a plan view illustrating the display apparatus, and FIG. 3 is an enlarged plan view illustrating a main part indicated by the sign A in FIG. 2.

In FIG. 1, the display apparatus is configured by inserting a liquid crystal layer 3 between a first glass substrate 1 (corresponding to a substrate) and a second glass substrate 2. Between one surface of the first glass substrate 1 and that of the second glass substrate 2 facing each other, a sealing material 31 for sealing a liquid crystal to be sealed within the liquid crystal layer 3 is provided along a peripheral part of the second glass substrate 2.

On the one surface of the first glass substrate 1, pixel electrodes 12 of display pixels respectively connected to a plurality of TFTs 11 and an orientation film 13 are laminated and formed. On the other surface of the first glass substrate 1, a polarization plate 14 is adhered. On one end part of the one surface of the first glass substrate 1, a first supply circuit substrate (corresponding to a first supply part) 15, which is described later, is placed.

Wirings for connecting the first supply circuit substrate 15 and the TFTs 11, which are formed on the one surface of the first glass substrate 1, are not illustrated in FIG. 1.

On the one surface of the second glass substrate 2, color filters 21 of three colors of R, G, B corresponding to the respective display pixels, a counter electrode (common electrode) 22 of the display pixels, and an orientation film 23 are laminated and formed. On the other surface of the second glass substrate 2, a polarization plate 24 is attached.

In the polarization plate 14 and the polarization plate 24, polarization directions (polarization planes) of light passing through them are different from each other by 90 degrees. The pixel electrode 12 and the counter electrode 22 are transparent electrodes made of ITO (Indium Tin Oxide), for example. The display pixels are placed in a region (display region which is described later) closer to the color filter 21 side than broken lines.

Referring to FIG. 2, the first glass substrate 1 and the second glass substrate 2 are formed into horizontally long and rectangular shapes, and adhered with each other by the sealing material 31 in such a manner that one short side and one long side of the first glass substrate and those of the second glass substrate 2 are respectively overlapped with each other. An end part along the other short side and an end part along the other long side of the first glass substrate 1 do not overlap with the second glass substrate 2, and two first supply circuit substrates 15 and four second supply circuit substrates (corresponding to a second supply part) 16 are respectively attached on one surfaces of the above-mentioned end parts. Within a rectangular region where the first glass substrate 1 and the second glass substrate 2 are overlapped with each other, the most part excluding a peripheral part represents a display region 4 on which an image is displayed.

The first supply circuit substrates 15 may be attached to the end parts along the respective short sides, which are opposite to each other, of the first glass substrate 1. In this case, the first glass substrate 1 and the second glass substrate 2 are attached with each other by the sealing material 31 in such a manner that their one long sides are overlapped with each other and the end parts respectively along the opposed short sides of the first glass substrate 1 are not overlapped with the second glass substrate 2.

In the display region 4, display pixels corresponding to the respective TFTs 11 are arranged in a matrix, and the TFTs 11 in the respective rows and the respective columns are connected to scanning signal bus lines and data signal bus lines (not illustrated). From the scanning signal bus line and the data signal bus line of each of the rows and each of the columns, a plurality of scanning signal wirings (corresponding to first conductive patterns) 150 and a plurality of data signal wirings (corresponding to second conductive patterns) 160 extend outside the display region 4, respectively. Hereinafter, a wiring and a conductive pattern are used in the same meaning unless specifically distinguished.

The scanning signal wirings 150 are separated into two systems and connected to the two first supply circuit substrates 15. The data signal wirings 160 are separated into four systems and connected to the four second signal supply circuit substrates 16. Wiring material of the scanning signal wirings 150 and the data signal wirings 160 takes, for example, aluminum or copper as a main component (same applies to a dummy wiring 151 which is described later). The numbers of the first supply circuit substrates 15 and the second supply circuit substrates 16 are not limited to two and four, respectively.

Referring to FIG. 3, the scanning signal wirings 150 are formed with equal pitches and equal intervals (that is, with equal conductor widths). At a position adjacent to the outermost scanning signal wiring 150 of the plurality of scanning signal wirings 150 extending from the display region 4 and connected to the first supply circuit substrate 15, a dummy wiring (third conductive pattern) 151 which is not connected to any circuit is provided. The dummy wiring 151 has a conductor width which is substantially the same as the conductor width of the scanning signal wiring 150, and the distance from the adjacent scanning signal wiring 150 is substantially the same as the interval between the scanning signal wirings 150.

In the display apparatus configured as described above, scanning signals are sequentially supplied from the two first supply circuit substrates 15 to the TFTs 11 in the respective rows through the respective scanning signal wirings 150. Then, as to pixel electrodes 12 of the display pixels in a row to which a scanning signal is supplied, data signals are simultaneously written from the four second supply circuit substrates 16 through the respective data signal wirings 160 and the respective TFTs 11 in the row. The first supply circuit substrate 15 and the second supply circuit substrate 16 may generate a scanning signal and a data signal, respectively, or may relay signals generated outside. In this manner, data signals for one line are sequentially written in the pixel electrodes 12 in the display pixels in every row.

On the other hand, at a side facing the other surface of the first glass substrate 1 as illustrated in FIG. 1, a backlight which is not illustrated is placed. Light emitted from the backlight passes through the polarization plate 14 and becomes linearly polarized light, the polarization direction thereof is changed when passing through the liquid crystal layer 3, and passes through the polarization plate 24 so as to be visually recognized by a person. In this case, as the amount of change in the polarization direction at the liquid crystal layer 3 corresponds to (integrated value of) a data signal written in the pixel electrode 12, the amount of light per display pixel passing through the polarization plate 24 changes in accordance with a data signal. Then, such an assembly of pixels is visually recognized as an image by a person.

In a recent display apparatus, a so-called narrowing frame width has been advanced and thus scanning signal wiring 150 has been fined. Therefore, there is a case where resistance values of the scanning signal wirings 150 are not uniform due to the difference in the degrees of etching progresses when forming conductive patterns. More specifically, among the plurality of scanning signal wirings 150 connected to the first supply circuit substrate 15, a scanning signal wiring 150 placed outside becomes thinner and the resistance value thereof increases. Such an increase in the resistance value cannot be ignored when the width of the conductor pattern is less than or equal to 10 µm, for example.

Herein, when the resistance value of a particular scanning signal wiring 150 increases, the rising is delayed at ON and also the ON-resistance increases for the entire TFTs 11 in a row to which a scanning signal is supplied through the scanning signal wiring 150. Therefore, for the entire pixels in the row, the writing of data signals supplied from the data signal wirings 160 becomes insufficient, whereby the control of the polarization direction of light passing through becomes insufficient. As a result, the entire pixels for one line are visually recognized as a dark line darker (or bright line brighter) than that is supposed to be displayed.

It is noted that, whether a display pixel is displayed darker than the supposed brightness or a display pixel is displayed brighter than the supposed brightness depends on whether the display pixel shields light (so-called normally black) or the display pixel transmits light (so-called normally white) in a state where no data signal is written in the display pixel.

The inventors of the present invention have found that, a dark line (or bright line) is visually recognized for display pixels in a row to which a scanning signal is supplied through substantially the outermost scanning signal wiring 150 among the plurality of scanning signal wirings 150 connected to the first supply circuit substrate 15.

As illustrated in FIGS. 2 and 3, a dummy wiring 151 which is not connected to any circuit is formed at a position adjacent to the outermost scanning signal wiring 150 in order to avoid the visual problem as described above. With this, the dummy wiring 151 is etched as if it is the outermost scanning signal wiring 150, thereby effectively easing a phenomenon in which the conductor width of the outermost scanning signal wiring 150 becomes thinner.

However, as the dummy wiring 151 is not connected to any circuit in the display apparatus, the impedance to another conductor is quite high. Therefore, the dummy wiring 151 is easy to have a high potential because of accumulated charges due to static electricity by which a peripheral circuit may be affected by electrostatic breakdown. If the electrostatic breakdown spreads to the display region 4, a display defect occurs. Thus, according to Embodiment 1, the positional relation between the dummy wiring 151 and the peripheral circuit is restricted.

Figure 4:
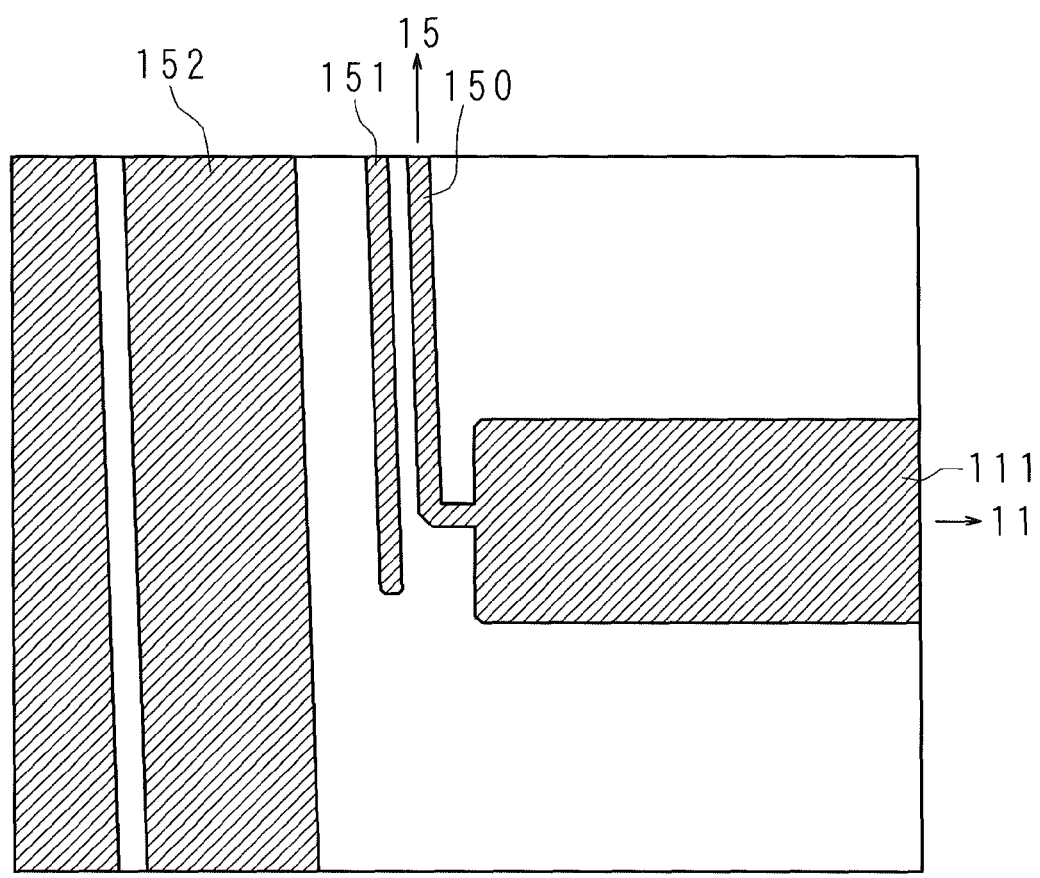
FIG. 4 is an enlarged plan view illustrating a part of a first glass substrate of the display apparatus.

FIG. 4 is an enlarged plan view illustrating a part of the first glass substrate 1 of the display apparatus. In the drawing, one end of one scanning signal wiring 150 with the other end connected to the first supply circuit substrate 15 is connected to one scanning signal bus line 111 within the display region 4. The scanning signal bus line 111 is for supplying a scanning signal for TFTs 11 in one row. The dummy wiring 151 placed in a position adjacent to the scanning signal wiring 150 has separation distances from the scanning signal bus line 111 and the adjacent conductive pattern 152 which are greater than a separation distance from the scanning signal wiring 150.

Although an end part of the dummy wiring 151 at the display region 4 side is not bent in FIG. 4, also for the case where the end part is bent along the scanning signal wiring 150, the separation distance between the bent end part and the scanning signal bus line 111 is made greater than the separation distance between the dummy wiring 151 and the scanning signal wiring 150. By maintaining such a positional relation, electrostatic breakdown is hard to spread from the dummy wiring 151 to the peripheral circuit.

As described in Embodiment 1, the two first supply circuit substrates 15 supply scanning signals to display pixels in the respective rows, and the four second supply circuit substrates 16 supply data signals to display pixels in the respective columns. Then, a dummy wiring 151 is placed in a position adjacent to the outermost scanning signal wiring 150 on each of the substrates among the plurality of scanning signal wirings 150 connected to the first supply circuit substrates 15. Moreover, it is configured in such a manner that the separation distance between the dummy wiring 151 and a peripheral conductor excluding the scanning signal wiring 150 is greater than the separation distance between the dummy wiring 151 and the scanning signal wiring 150.

With this configuration, it is possible to suppress that electrostatic breakdown spreads from the dummy wiring 151 to the peripheral conductor and the connected party of the conductor.

Accordingly, even when a dummy wiring is placed adjacent to a signal wiring for supplying a driving signal to a display region, it is possible to suppress electrostatic breakdown derived from the presence of the dummy wiring.

Moreover, the dummy wiring 151 has substantially the same conductor width as the scanning signal wiring 150, and is separated from the adjacent scanning signal wiring 150 with substantially the same distance as the separated distance between the scanning signal wirings 150.

Accordingly, the dummy wiring 151 is etched as if it is a part of the scanning signal wirings 150, thereby effectively easing a phenomenon in which the conductor width of the outermost scanning signal wiring 150 becomes thinner.

Embodiment 2

While Embodiment 1 is an embodiment in which a dummy wiring 151 is placed adjacent to the outermost scanning signal wiring 150 among the plurality of scanning signal wirings 150 connected to each of the first supply circuit substrates 15, Embodiment 2 is an embodiment in which a dummy wiring 161 is placed adjacent to the outermost data signal wiring 160 among a plurality of data signal wirings 160 connected to each of second supply circuit substrates 16.

Figure 5:
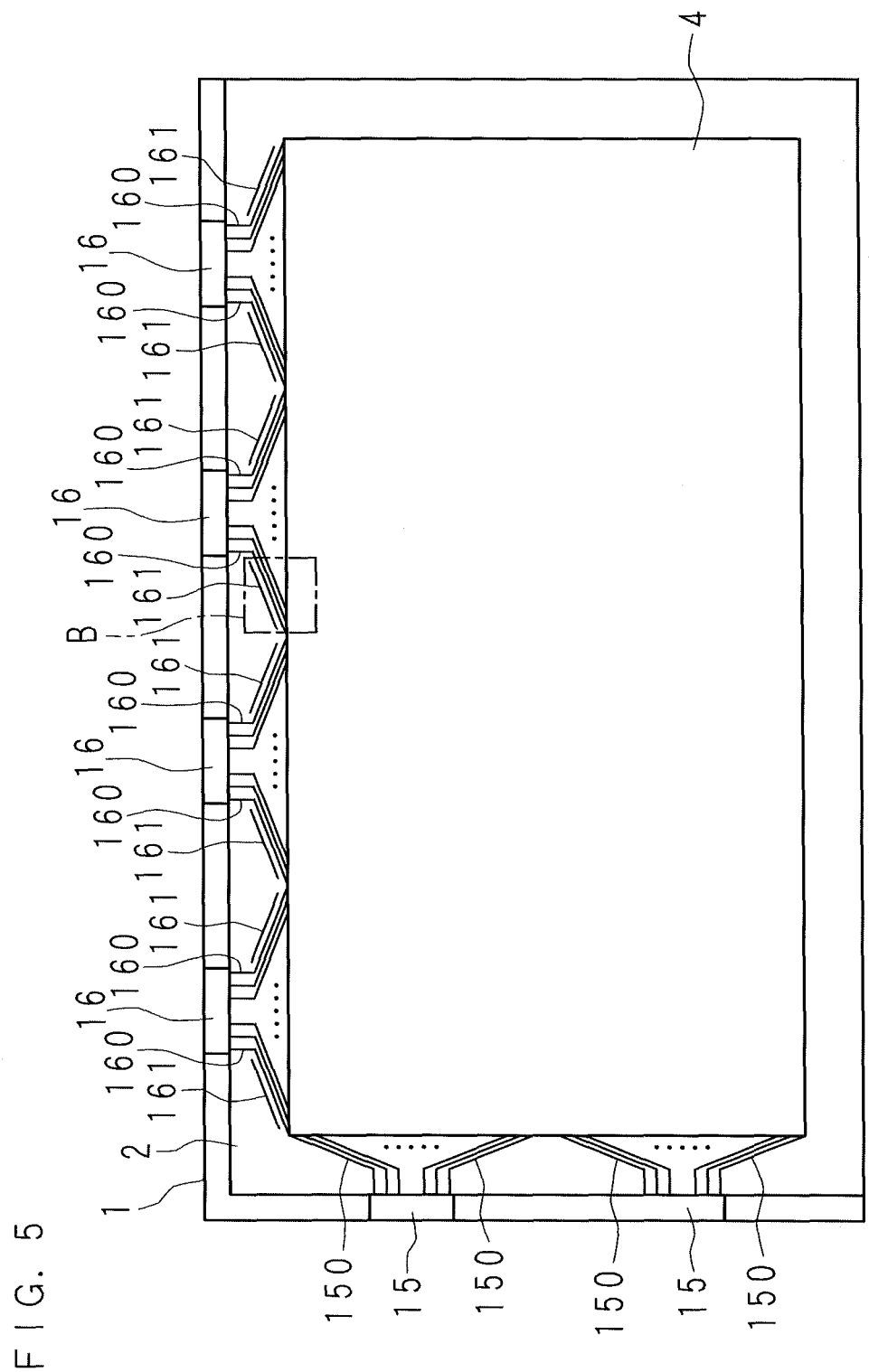
FIG. 5 is a plan view illustrating a display apparatus according to Embodiment 2 of the present invention.
Figure 6:
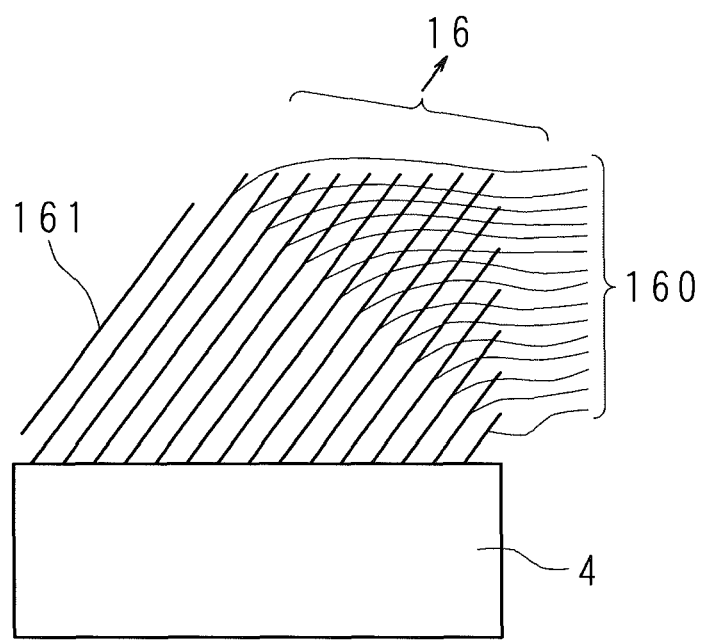
FIG. 6 is an enlarged plan view illustrating a main part indicated by the reference sign B in FIG. 5.

FIG. 5 is a plan view illustrating a display apparatus according to Embodiment 2 of the present invention, and FIG. 6 is an enlarged plan view illustrating a main part indicated by the reference sign B in FIG. 5. The data signal wirings 160 are formed with equal pitches and equal intervals (that is, with equal conductor widths). At a position adjacent to the outermost data signal wiring 160 of the plurality of data signal wirings 160 extending from the display region 4 and connected to the second supply circuit substrate 16, a dummy wiring (corresponding to a third conductive pattern) 161 which is not connected to any circuit is provided. The dummy wiring 161 has a conductor width which is substantially the same as the conductor width of the scanning signal wiring 160, and the distance from the adjacent scanning signal wiring 160 is substantially the same as the interval between the scanning signal wirings 160.

Herein, when the resistance value of a particular data signal wiring 160 increases, the amplitude of a data signal decreases for the entire TFTs 11 in a column to which the data signal is supplied through the data signal wiring 160. Therefore, for the entire pixels in the column, the writing of a data signal becomes insufficient, whereby the control of the polarization direction of light passing through becomes insufficient. As a result, the entire pixels for one column are visually recognized as a dark line darker (or bright line brighter) than that is supposed to be displayed.

As illustrated in FIGS. 5 and 6, a dummy wiring 161 which is not connected to any circuit is formed at a position adjacent to the outermost data signal wiring 160 in order to avoid the visual problem as described above. With this, the dummy wiring 161 is etched as if it is the outermost data signal wiring 160, thereby effectively easing a phenomenon in which the conductor width of the outermost data signal wiring 160 becomes thinner.

However, as the dummy wiring 161 is not connected to any circuits in the display apparatus, the impedance to another conductor is quite high. Therefore, the dummy wiring 161 is easy to have a high potential because of accumulated charges due to static electricity by which peripheral circuit may be affected by electrostatic breakdown. If the electrostatic breakdown spreads to the display region 4, a display defect occurs. Thus, according to Embodiment 2, the positional relation between the dummy wiring 161 and the peripheral circuit is restricted.

More specifically, the dummy wiring 161 placed adjacent to the data signal wiring 160 is configured in such a manner that the separation distances from a data signal bus line for supplying a data signal to TFTs 11 in one column and another conductive pattern around the dummy wiring 161 are greater than the separation distance from the data signal wiring 160. In this case, the positional relation among the data signal wiring 160, the dummy wiring 161 and the data signal bus line is substantially the same as the positional relation among the scanning signal wiring 150, the dummy wiring 151 and the scanning bus line 111 in FIG. 4.

Also, as to a case where an end part of the dummy wiring 161 is bent along the data signal wiring 160, it is configured in such a manner that the separation distance between the bent part and the data signal bus line is greater than the separation distance between the dummy wiring 161 and the data signal wiring 160. By maintaining such a positional relation, electrostatic breakdown is hard to spread from the dummy wiring 16 to a peripheral circuit.

Same reference numerals are assigned to the portions which are similar to those in Embodiment 1, and no detailed description thereof is provided.

As described in Embodiment 2, a dummy wiring 161 is placed in a position adjacent to the outermost data signal wiring 160 on each of the substrates among the plurality of scanning wirings 160 connected to the respective second supply circuit substrates 16. It is configured in such a manner that the separation distance between the dummy wiring 161 and the peripheral conductor excluding the data signal wiring 160 is greater than the separation distance between the dummy wiring 161 and the data signal wiring 160.

With this configuration, it is possible to suppress that the electrostatic breakdown spreads from the dummy wiring 161 to a peripheral conductor and the connected party of the conductor.

Accordingly, even when a dummy wiring is placed adjacent to a signal wiring for supplying a driving signal to a display region, it is possible to suppress the electrostatic breakdown derived from the presence of the dummy wiring.

Moreover, the dummy wiring 161 has substantially the same conductor width as the data signal wiring 160, and is separated from the adjacent data signal wiring 160 with substantially the same distance as the separated distance between the data signal wirings 160.

Accordingly, the dummy wiring 161 is etched as if it is a part of the data signal wirings 160, thereby effectively easing a phenomenon in which the conductor width of the outermost data signal wiring 160 becomes thinner.

Embodiment 3

While Embodiment 1 is an embodiment where the scanning signal wirings 150 and the dummy wirings 151 are arranged in the same plane on one surface of the first glass substrate 1, Embodiment 3 is an embodiment where scanning signal wirings 150 and a dummy wiring 151 are placed on the upper surface side (one surface side) of an insulating layer formed on one surface of a first glass substrate 1, and also a plurality of conductive patterns are placed on the lower surface side (other surface side) of the insulating layer.

Figure 7A:
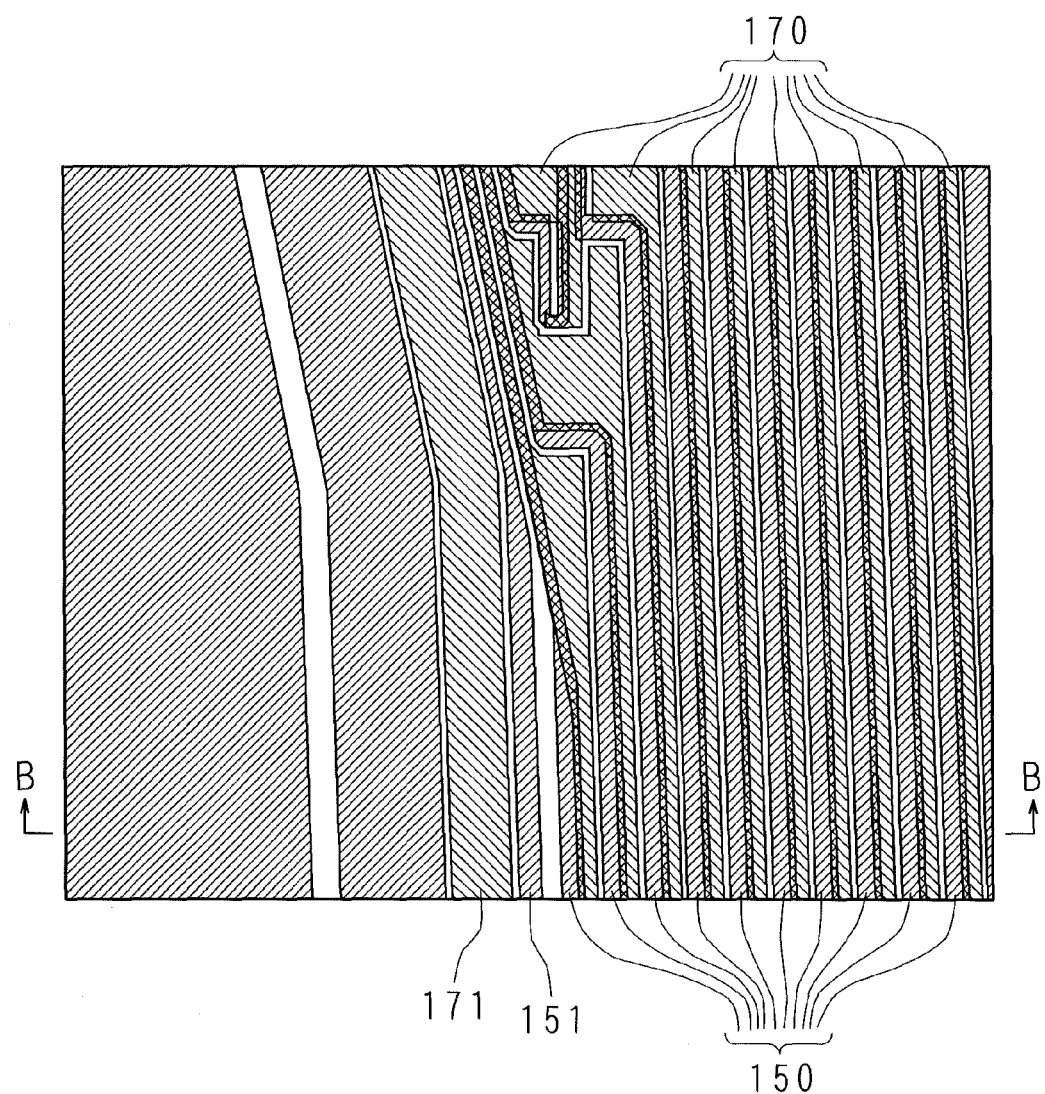
FIG. 7A is an enlarged plan view illustrating a part of a first glass substrate of a display apparatus according to Embodiment 3 of the present invention.
Figure 7B:
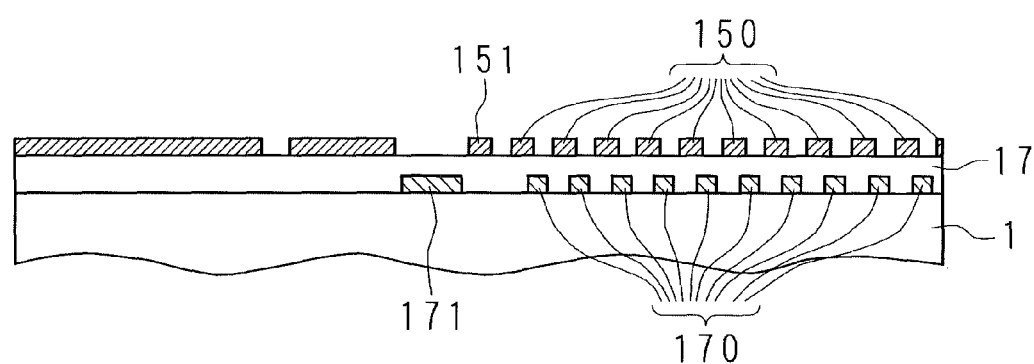
FIG. 7B is a cross-sectional view taken from line B-B of FIG. 7A.

FIG. 7A is an enlarged plan view illustrating a part of a first glass substrate 1 of the display apparatus according to Embodiment 3 of the present invention, and FIG. 7B is a cross-sectional view taken from line B-B of FIG. 7A. An insulating layer 17 is formed on one surface of the first glass substrate 1. The insulating layer 17 is not necessarily formed on the entire surface of the one surface of the first glass substrate 1 as long as it is formed at a portion that requires to be insulated when a signal wiring or a conductive pattern is three-dimensionally placed. On the upper surface side of the insulating layer 17, the scanning signal wirings 150 and the dummy wiring 151 are placed, and on the lower surface side, a plurality of light shielding conductive patterns (corresponding to fourth conductive patterns) 170 overlapped with the respective scanning signal wirings 150 are placed. Although the width of the overlapping is generally made to be about one fourth of the width of the scanning signal wiring 150, it is not limited thereto. In FIG. 7B, there is a case where, above the scanning signal wirings 150 and the dummy wiring 151, a signal wiring or a conductive pattern is further provided via another insulating layer. This case is not illustrated.

As illustrated in the upper part in FIG. 7A, some of the scanning signal wirings 150 are meandering such that each of the scanning signal wirings 150 has the same total length. In the present invention, a part where the scanning signal wirings 150 are not formed with the same pitches and the same intervals is not excluded, and if the scanning signal wirings 150 do not have the same total length, the width of a conductive pattern is changed such that the scanning signal wirings 150 are adjusted to have the same resistance value.

With the light shielding conductive patterns 170 having the above-described overlapping, the amount of light from a backlight passing through a gap between the adjacent scanning signal wirings 150 is reduced. The light shielding conductive patterns 170 are also used as substitute conductive patterns for the scanning signal wirings 150 overlapping with the light shielding conductive patterns 170. That is, in a case where a scanning signal wiring 150 is cut in a middle, by irradiating an overlapped portion between the scanning signal wiring 150 and the light shielding conductive pattern 170 at both sides of the cut ends with a laser beam so as to melt the overlapped portion, the scanning signal wiring 150 detours the light shielding conductive pattern 170 for conduction.

At the lower surface side of the insulating layer 17, another light shielding conductive pattern (corresponding to another conductive pattern) 171 which does not overlap with the dummy wiring 151 is placed. The above-mentioned another light shielding conductive pattern 171 is formed in a position adjacent to the dummy wiring 151 in a planar view.

Since the dummy wiring 151 does not need to use the above-mentioned another light shielding conductive pattern 171 as a substitute conductive pattern, the dummy wiring 151 does not have any overlapping with the above-mentioned another light shielding conductive pattern 171 and the light shielding conductive patterns 170. On the other hand, in a case where such an overlapping is generated, for example, due to a margin of error occurred in manufacturing, the overlapping is made smaller than the overlapping between the scanning signal wiring 150 and the light shielding conductive pattern 170. With such a configuration, the storage amounts of capacitances are suppressed which are incidentally formed among the dummy wiring 151, the above-mentioned another light shielding conductive pattern 171 and the light shielding conductive patterns 170.

In Embodiment 3, the scanning signal wirings 150 and the dummy wiring 151 are placed on the upper surface side of the insulating layer 17, and the light shielding conductive patterns 170 and the above-mentioned another light shielding conductive pattern 171 are placed on the lower surface side of the insulating layer 17. To the contrary, it may also be possible to place the light shielding conductive patterns 170 and the above-mentioned another light shielding conductive pattern 171 on the upper surface side of the insulating layer 17, and place the scanning signal wirings 150 and the dummy wiring 151 on the lower surface side of the insulating layer 17.

Same reference numerals are assigned to the portions which are similar to those in Embodiment 1, and no detailed description thereof is provided.

As described in Embodiment 3, the insulating layer 17 is formed on the one surface of the first glass substrate 1, and the scanning signal wirings 150 and the dummy wiring 151 are placed on the upper surface side of the insulating layer 17, and the light shielding conductive patterns 170 overlapping with the respective scanning signal wirings 150 are placed on the lower surface side of the insulating layer 17. As to the above-mentioned another conductive pattern 171 and each of the light shielding conductive patterns 170 on the lower surface side of the insulating layer 17, even when they are overlapped with the dummy wiring 151, the overlapping is made smaller than the overlapping between the scanning signal wiring 150 and the light shielding conductive patterns 170.

Accordingly, in a case where the light shielding conductive patterns 170 and the above-mentioned another light shielding conductive pattern 171 provided on the lower surface side of the insulating layer 17 are used as light shielding parts for shielding a backlight, for example, it is harder to form capacitances among the above-mentioned another light shielding conductive pattern 171, the light shielding conductive patterns 170 and the dummy wiring 151, thereby suppressing electrostatic breakdown derived from the presence of the dummy wiring 151.

In Embodiment 3, a case is described where the dummy wiring 151 and the scanning signal wirings 150 are placed on the upper surface side of the insulating layer 17. The same also applies to a case where a dummy wiring 161 and the data signal wirings 160 are placed on the upper surface side of the insulating layer 17. Specifically, it is configured in such a manner that a plurality of light shielding conductive patterns 170 overlapping with the respective data signal wirings 170 on the lower surface side of the insulating layer 17 are provided, and the dummy wiring 161 does not overlap with the above-mentioned another light shielding conductive pattern 171 and the light shielding conductive patterns 170 provided on the lower surface side of the insulating layer 17, or have overlapping smaller than the overlapping between the data wirings 160 and the light shielding conductive patterns 170. With this configuration, it is possible to suppress electrostatic breakdown derived from the presence of the dummy wiring 161.

Embodiment 4

While Embodiment 1 is an embodiment where each of the scanning signal wirings 150 and the dummy wiring 151 is formed with a unicursal conductive pattern, Embodiment 4 is an embodiment where each of scanning signal wirings 150 and a dummy wiring 151 forms a plurality of branch patterns.

Figure 8:
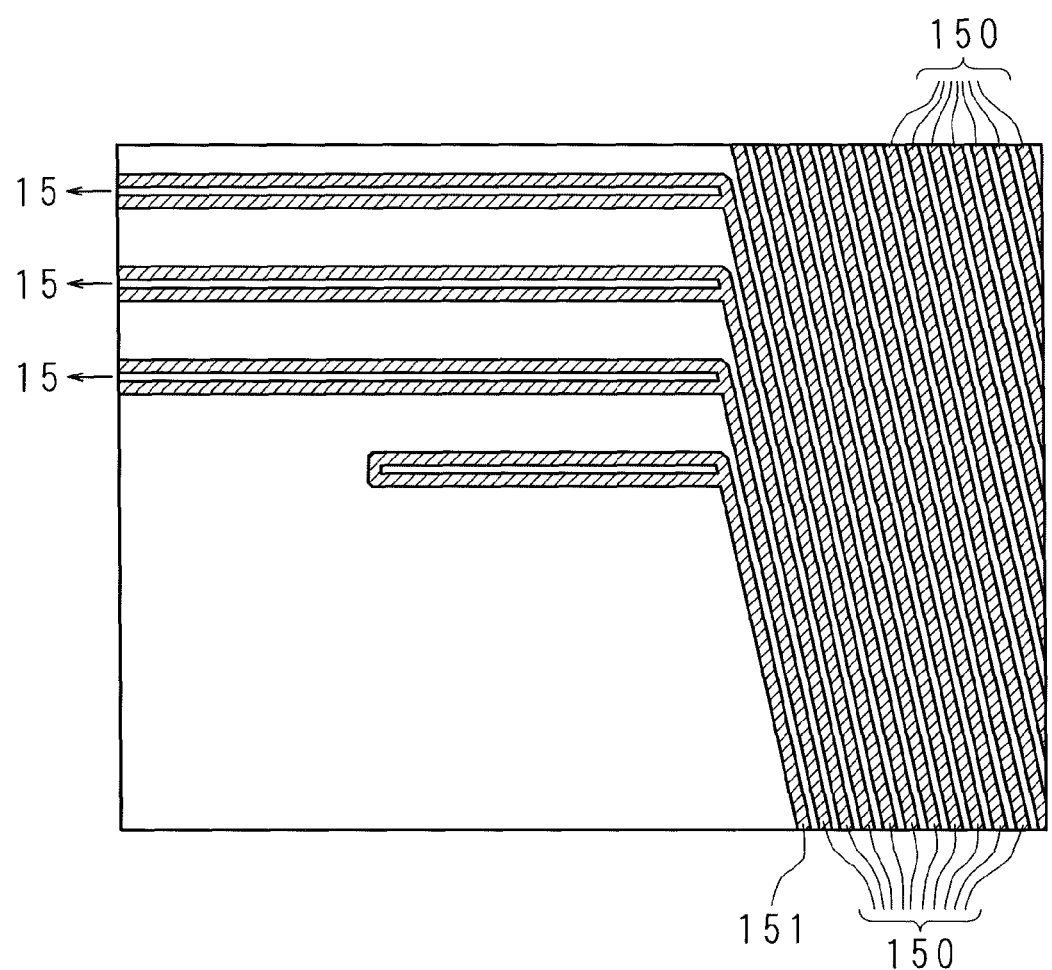
FIG. 8 is an enlarged plan view illustrating a part of a first glass substrate of a display apparatus according to Embodiment 4 of the present invention.

FIG. 8 is an enlarged plan view illustrating a part of a first glass substrate of a display apparatus according to Embodiment 4 of the present invention. Each of the scanning signal wirings 150 and the dummy wiring 151 is branched into two branch patterns toward a first supply circuit substrate 15. As to the dummy wiring 151 among them, end parts of the two branch patterns thereof are connected with each other so as to form a roundish shape as a whole. The number of the branch patterns is not restricted to two.

By making the scanning signal wirings 150 and the dummy wiring 151 branched in such a manner, when the sealing material 31 illustrated in FIG. 1 is irradiated with an ultraviolet ray from the first glass substrate 1 side to be hardened, the ultraviolet ray suitably detours the scanning signal wirings 150 and the dummy wiring 151. An end part of the dummy wiring 151 is separated from the first supply circuit substrate 15 in order to avoid receiving influence of static electronic charged on a human body when the person touches the vicinity of the first supply circuit substrate 15 during the manufacturing. The separation distance is set to be 30 µm or more, but it is preferably set to be 50 µm or more.

Same reference numerals are assigned to the portions which are similar to those in Embodiment 1, and no detailed description thereof is provided.

As described in Embodiment 4, in a case where a part of each of the scanning signal wirings 150 is branched into two branch patterns toward the first supply circuit substrate 15, the dummy wiring 151 is also branched into two branch patterns toward the first supply circuit substrate 15 while end parts of the branches at the first supply circuit substrate 15 side are connected with each other so as to eliminate a pointed end part.

Accordingly, for example, in manufacturing, in a process of irradiating the sealing material 31 with an ultraviolet ray from the first glass substrate 1 side, even when the scanning signal wirings 150 and the dummy wiring 151 near the first supply circuit substrate 15 are made relatively thicker, it is possible that the ultraviolet ray to be directed to the sealing material 31 is not widely shielded. Also, it is possible to reduce influence of electrostatic on the dummy wiring 151.

In Embodiment 4, a case is described where the dummy wiring 151 is placed on one surface of the first glass substrate 1. The same also applies to a case where a dummy wiring 161 is placed on the same surface. Specifically, it is configured in such a manner that each of the data signal wirings 160 and the dummy wiring 161 is branched into two branch patterns toward a second supply circuit substrate 16. As to the dummy wiring 161 among them, end parts of the two branch patterns are connected with each other so as to eliminate a pointed end part. With this configuration, it is possible that the ultraviolet ray directed to the sealing material 31 from the first glass substrate 1 side is not widely shielded. Also, it is possible to reduce influence of electrostatic on the dummy wiring 161.

The embodiments as disclosed are illustrative and not restrictive in all respects. The scope of the present invention is defined by the claims rather than by the description preceding them, and all changes that fall within metes and bounds of the claims, or equivalence of such metes and bounds thereof are therefore intended to be embraced by the claims. Also, the technical features described in the respective embodiments can be combined with each other.

The invention claimed is:

1. A display apparatus comprising:
  a substrate;
  a display region including a plurality of display pixels arranged in a matrix on the substrate;
  a plurality of first conductive wirings placed on the substrate, extending outside the display region corresponding to rows of the plurality of display pixels, formed with substantially equal pitches and equal intervals, separated into a plurality of systems, and gathered toward a side of the substrate in each of the plurality of systems;
  a plurality of second conductive wirings placed on the substrate, extending outside the display region corresponding to columns of the display pixels, formed with substantially equal pitches and equal intervals, and separated into a plurality of systems;
  a first supply part provided on the substrate, and supplying a driving signal through the first conductive wirings to the display pixels;
  a second supply part provided on the substrate, and supplying a driving signal through the second conductive wirings to the display pixels; and
  a third conductive wiring placed on the substrate to be directly adjacent to the outermost wiring of the first conductive wirings (or the second conductive wirings) of each system at gathering portions between the display region and the first supply part (or the second supply part), wherein
  the third conductive wiring is not connected to any conductive part and has a separation distance from a peripheral conductor part excluding the first conductive wirings (or the second conductive wirings) greater than a separation distance from the first conductive wirings (or the second conductive wirings).

2. The display apparatus according to claim 1, further comprising:
  an insulating layer provided on the substrate, and having one surface on which the first conductive wirings (or the second conductive wirings) and the third conductive wiring are placed, and
  a plurality of fourth conductive wirings placed on the other surface of the insulating layer, and having overlapping with the first conductive wirings (or the second conductive wirings) respectively, wherein
  the third conductive wiring has overlapping with another conductive pattern and each of the fourth conductive wirings placed on the other surface of the insulating layer, the overlapping being smaller than the overlapping between the first conductive wirings (or the second conductive wirings) and the fourth conductive wirings, or the third conductive wiring has no overlapping with said another conductive pattern and the fourth conductive wirings.

3. The display apparatus according to claim 1, wherein the third conductive wiring has substantially a same conductive width as a width of one of the first conductive wirings (or the second conductive wirings), and separation distance from the first conductive wirings (or the second conductive wirings) is substantially same as a separation distance between the first conductive wirings (or the second conductive wirings).

4. The display apparatus according to claim 1, wherein the first conductive wirings (or the second conductive wirings) and the third conductive wiring are branched into a plurality of branch wirings toward the first supply part (or the second supply part), and
end parts of the branch wirings of the third conductive wiring are connected with each other.

5. A display apparatus comprising:
a substrate;
a display region including a plurality of display pixels arranged in a matrix on the substrate;
a plurality of first conductive wirings placed on the substrate, extending outside the display region corresponding to rows of the display pixels, separated into a plurality of systems, and gathered toward a side of the substrate in each of the plurality of systems;
a plurality of second conductive wirings placed on the substrate, extending outside the display region corresponding to columns of the display pixels, and separated into a plurality of systems;
a first supply part provided on the substrate, and supplying a driving signal through the first conductive wirings to the display pixels;
a second supply part provided on the substrate, and supplying a driving signal through the second conductive wirings to the display pixels;
an insulating layer provided on the substrate, and having one surface on which the first conductive wirings connected to the first supply part (or the second conductive wirings connected to the second supply part) are placed;
a third conductive wiring placed on the one surface of the insulating layer to be directly adjacent to the outermost wiring of the first conductive wirings (or the second conductive wirings) of each system at gathering portions between the display region and the first supply part (or the second supply part); and
a plurality of fourth conductive wirings placed on the other surface of the insulating layer, and having overlapping with the first conductive wirings (or the second conductive wirings) respectively, wherein
the third conductive wiring has overlapping with another conductive pattern and each of the fourth conductive wirings placed on the other surface of the insulating layer, the overlapping being smaller than the overlapping between the first conductive wirings (or the second conductive wirings), is not connected to any conductive part, and the fourth conductive wirings, or the third conductive wiring has no overlapping with said another conductive pattern and the fourth conductive wirings.

6. The display apparatus according to claim 5, wherein the third conductive wiring has substantially a same conductive width as a width of one of the first conductive wirings (or the second conductive wirings), and a separation distance from the first conductive wirings (or the second conductive wirings) is substantially a same as a separation distance between the first conductive wirings (or the second conductive wirings).

7. The display apparatus according to claim 5, wherein the first conductive wirings (or the second conductive wirings) and the third conductive wiring are branched into a plurality of branch wirings toward the first supply part (or the second supply part), and
end parts of the branch wirings of the third conductive wiring are connected with each other.

8. The display apparatus according to claim 1, wherein the first conductive wirings are connected to scanning signal bus lines within the display region.

9. The display apparatus according to claim 8, wherein the third conductive wiring has a separation distance from the scanning signal bus line greater than the separation distance from the first conductive wirings.

* * * * *